Patented June 27, 1950

2,512,726

UNITED STATES PATENT OFFICE 2,512,726

COMPOSITION OF VINYL CHLORIDE-ACETATE-ALCOHOL COPOLYMER

George R. Penn, Jr., South Charleston, and John F. Suter, Charleston, W. Va., assignors, by mesne assignments, to Union Carbide and Carbon Corporation, a corporation of New York No Drawing. Application September 20, 1944, Serial No. 555,040

12 Claims. (Cl. 260—19)

Copolymers of vinyl chloride with vinyl acetate, as introduced by E. W. Reid, U. S. Patents Nos. 1,935,577 and 2,052,658, have attained considerable recognition as coating materials. This recognition has been based in part on the outstanding chemical resistance of these copolymers, and this chemical resistance may be attributed to the influence of the vinyl chloride, which is usually the preponderant constituent. In their most useful embodiment at the present time, the copolymers employed in coatings contain from 85 to 96% vinyl chloride. Such copolymers are normally employed as the sole resinous or film-forming constituent of the coating composition, since they are not adequately compatible with many modifying ingredients of high molecular weight and diverse properties which are customarily employed in coating compositions to impart flexibility, hardness, increased moisture resistance, adhesiveness and other desirable properties to the film.

The copolymers of vinyl chloride and vinyl acetate are, however, compatible with certain liquid plasticizers, principally high-boiling esters, and such plasticizers are customarily employed in coating compositions. In such compositions, the ratio of plasticizers to copolymer is often critical in that small increments or decrements of plasticizer within the range of 10 to 25% by weight of the copolymer often markedly affect the tensile strength and elongation of the film. Thus, if a film is deposited containing the optimum amount of plasticizer, and a small amount of plasticizer is lost, as by evaporation, extraction, or migration, the film may be stiffened considerably.

We have discovered that by selective hydrolysis or alcoholysis of the copolymer of vinyl chloride with vinyl acetate, so that part, but not all, the acetate groups on the copolymer chain are replaced by hydroxyl groups, we obtain a copolymer of vinyl chloride, vinyl acetate and vinyl alcohol which will mix more readily with other substances to form new and useful compositions. This tri-component copolymer contains substantially all of the chlorine originally present in the resin, and it is not substantially degraded or discolored. The ratio of vinyl chloride to vinyl acetate in the original resin, and the degree of hydrolysis or alcoholysis is such that the resin, after hydrolysis, contains by weight from 70 to 96.5% vinyl chloride, from 2.0 to 20% vinyl alcohol and from 1.5 to 25% vinyl acetate. These copolymers of vinyl chloride, vinyl acetate and vinyl alcohol retain the desirable properties of the copolymers of vinyl chloride and vinyl acetate, such as their strength, flexibility and chemical resistance, but they are much more compatible with modifying ingredients, such as gums, resins, oils and high-boiling solvents or plasticizers. This increased compatibility of the copolymers of vinyl chloride, vinyl acetate and vinyl alcohol is an unexpected improvement, in that hydrolysis of the copolymer of vinyl chloride and vinyl acetate results in an increase in the weight percentage of vinyl chloride in the resin because of the difference in the molecular size of the hydroxyl and acetate groups, and the vinyl chloride content of the copolymers of vinyl chloride and vinyl acetate usually has the controlling influence on the compatability of the copolymer. For instance, copolymers of vinyl chloride and vinyl acetate containing 60% vinyl chloride are compatible with nitrocellulose, whereas copolymers containing 87% vinyl chloride are incompatible with nitrocellulose.

The extensive compatibility of the copolymers of vinyl chloride, vinyl acetate, and vinyl alcohol, with a wide range of modifying ingredients, as compared to copolymers of vinyl chloride and vinyl acetate is shown in the table below. In the table, I signifies incompatible, SI indicates slightly incompatible, and C denotes compatible. The compatibilities were determined by dissolving the copolymers together with the added ingredient in a mutual solvent in the ratio of one part of the copolymer to one of the added ingredient (or higher in a few instances), casting a film from the solution and baking when needed to set up the added ingredient. The films were examined for flexibility, strength, haziness, oiliness, or any other evidence of non-homogeneity.

| Added Ingredient | Copolymer of Vinyl Chloride 86.7%, Vinyl Acetate 13.3% | Copolymer of Vinyl Chloride 91.3%, Vinyl Alcohol 5.8%, Vinyl Acetate 2.9% |
|---|---|---|
| Oils and Plasticizers: | | |
| Raw linseed oil | I | O |
| Raw tung oil | I | O |
| Raw castor oil | I | O |
| Conjugated linseed oil | I | O |
| Methoxyethyl oleate | I [1] | O [1] |
| Xylyl heptadecyl ketone | I | O |
| 3-methyl-3,5-dihexyl-6-amyl-5-cyclohexenone | I | O |
| Di(butoxyethoxyethyl) succinate | I | O |
| Alkyd Resins: | | |
| "Paraplex" RG-2 (Plasticizing alkyd resin) | I | O |
| "Paraplex" RG-4 (Plasticizing alkyd resin) | I | O |
| "Paraplex" 5-B (Plasticizing alkyd resin) | I | O |
| "Paraplex" G-20 (Plasticizing alkyd resin) | I | O |
| "Paraplex" G-25 (Plasticizing alkyd resin) | C | O |
| "Paraplex" RG-7 (Plasticizing alkyd resin) | I | O |
| "Paraplex" AL-16 (Plasticizing alkyd resin) | I | O |
| "Rezyl" 113 (Drying type alkyd resin) | I | O |
| "Duraplex" ND-75 (Glyceryl-phthalate resin modified with non-drying oil fatty acids) | I | O |
| "Duraplex" A-27 (Drying type glyceryl-phthalate resin modified with drying oil fatty acids) | I | O [1] |
| "Petrex" 6 (Unmodified glyceryl-terpene-maleate adduct resin) | I | O [1] |
| "Teglac" 15 (Rosin modified alkyd resin, maleic type) | I | C [1] |
| "Teglac" 161 (Rosin modified alkyd resin, maleic type) | I | O |
| "Beckosol" 1324 (Long oil, non-drying alkyd resin) | I | O |
| "Beckosol" 1333 (Medium oil, drying type alkyd resin) | | |
| Castor oil modified glyceryl-phthalate resin | I | O |
| Drying oil modified glyceryl-endomethylene tetrahydrophthalate resin | I | O |
| Reaction product of linseed fatty acids 1.4 mols, phthalic anhydride 0.80 mol, glycerol 1.1 mols, acid No. 16.3 | I | O |
| "Amberol" 801 (Glyceryl-rosin-maleate resin) | I | O |
| Thermoplastic Resins: | | |
| Polyvinyl acetate | I | O |
| Polyvinyl partial butyral resin, 11% vinyl alcohol | I | O |
| Partially hydrolyzed polyvinyl acetate, 9% vinyl alcohol | I | O |
| "Acryloid" C-10 (Polymerized alkyl acrylate) | I | O |
| Phenolic Resins: | | |
| Paraphenylphenol-formaldehyde varnish containing tung oil and linseed oil | I | O |
| Oil modified phenolic resins, heat-reactive | I | O |
| Drying oil modified phenolic resin solution | I | O |
| Aminoplasts: | | |
| "Uformite" F-226 (Urea-formaldehyde resin) | I | O |
| "Uformite" F-301 (Alkyd modified urea-formaldehyde resin) | I | O |
| "Beetle" 202-11 (Urea-formaldehyde resin) | I | O |
| "Beetle" 219-8 (Urea-formaldehyde resin) | I | O |
| "Beetle" 227-8 (Urea-formaldehyde resin) | I | O |
| "Beetle" 592-8 (Alkyd modified urea-formaldehyde resin) | I | C |
| "Beckamine" P-138 (Urea-formaldehyde resin) | I | C |
| "Melmac" 586-9 (Melamine-formaldehyde resin) | I [1] | C [1] |
| Gums, Rosins and Resins: | | |
| Rosin FF | C | C [1] |
| Mastic gum | SI | C [1] |
| Elemi gum | C | C [1] |
| Ester gum | O | C [1] |
| Shellac | I | O [1] |

[1] Ratio of vinyl copolymer to ingredient 4:1.
[2] Vinyl alcohol content 11.4%.

The physical properties of most of the above ingredients are published in "The Condensed Chemical Dictionary," 3rd edition (1942), Reinhold Publishing Corporation.

The copolymers of vinyl chloride, vinyl acetate, and vinyl alcohol are compatible with many plasticizers of known types. An important distinction of these copolymers is that, although they may be combined with plasticizers to make flexible films, the proportions required for flexibility do not unduly soften or weaken the films and make them excessively elastic. The plasticized films, although flexible, are not limp.

The copolymers of vinyl chloride, vinyl acetate and vinyl alcohol have higher softening points than the copolymers of vinyl chloride and vinyl acetate of corresponding molecular weights. For instance, a copolymer of vinyl chloride and vinyl acetate having an average molecular weight of about 10,000, as determined by Staudinger's method, and containing 87% vinyl chloride and 13% vinyl acetate, has a softening point of 130° C., determined by the ball and ring method with films 0.0025 inch thick. (Modified A. S. T. M. E28-427). When this resin is hydrolyzed so that it contains 5% vinyl alcohol by weight, it has a softening point of 160° C. Resins of comparable molecular weight and vinyl acetate content, having vinyl alcohol contents of above 10%, appear to have softening points above 200° C.

Despite their hydroxyl content, the copolymers of vinyl chloride, vinyl acetate, and vinyl alcohol have improved resistance to the transmission of moisture vapor in comparison with the unhydrolyzed copolymers, and they retain this resistance even when plasticized.

For instance, the following data have been obtained on unplasticized resins:

| Resin No. | Per Cent Vinyl Chloride | Per Cent Vinyl Acetate | Per Cent Vinyl Alcohol | Moisture Vapor Transmission Rate [1] |
|---|---|---|---|---|
| 1 | 88.0 | 12.0 | 0.0 | 0.65 |
| 2 | 92.1 | 2.9 | 5.0 | 0.36 |
| 3 | 70.5 | 29.5 | 0.0 | 1.29 |
| 4 | 80.1 | 5.7 | 14.2 | 0.59 |

The following data have been obtained with the plasticized resins:

| Resin No. | Per Cent Di(butoxyethyl) Phthalate | Moisture Vapor Transmission Rate [1] |
|---|---|---|
| 1 | 15 | 0.79 |
| 2 | 25 | 0.69 |

[1] $M.V.T. = \frac{W \times t}{A \times T} \times 10^4$ where

W = grams of moisture vapor transmitted at 35° C. with saturated water vapor on one side of the film and a dry atmosphere on the other
t = thickness of film in centimeters
A = area of film in square centimeters
T = time in hours.

Lacquer films containing the hydrolyzed copolymers have improved adhesion to smooth surfaces, such as steel, as compared to the unhydrolyzed copolymer, although in air-drying finishes it is desirable that the hydrolyzed copolymer contain at least about 10% vinyl alcohol for good adhesion to steel surfaces on air-drying. The hydrolyzed copolymers containing more than 2.0% vinyl alcohol exhibit good adhesion to steel surfaces after baking at 250° F., a temperature which is lower by about 100° F. than the recommended baking temperature for the unhydrolyzed copolymer. The lower baking temperatures lessen the possibility of the resin being deteriorated, and are considerably easier to achieve in commercial practice. Also, lacquers containing copolymers of vinyl chloride, vinyl acetate, and vinyl alcohol containing more than 2.0% vinyl alcohol show excellent adhesion on air-drying to metals over which many types of commercial primers have been applied, such as phenol-formaldehyde varnishes, oil-modified alkyd resins and phenol-formaldehyde "dispersion" type resins. On the other hand, copolymers of vinyl chloride and vinyl acetate usually exhibit very poor adhesion to commercial metal primer coatings on air-drying.

Solutions of the copolymers of vinyl chloride, vinyl acetate, and vinyl alcohol in the usual ketone and ester solvents, have a higher tolerance for alcohols, such as butanol, than do the unhydrolyzed copolymers. By a higher tolerance for alcohols is meant that alcohols may be included in amounts up to about 50% of the total thinner, depending on the vinyl alcohol content of the resin, without the solutions becoming unduly viscous or precipitation of the dissolved resin occurring. However, copolymers containing 30 to 35% vinyl alcohol are dissolved by alcohols, such as butanol, and finishes containing such copolymers in unmodified form are attacked by alcohols and to somewhat less extent by water. Copolymers of increasing vinyl alcohol content have increasing resistance to aromatic hydrocarbons and other paint thinners, but also show increased insolubility in solvents other than alcohols. Thus, the copolymers containing from 2.0 to 20% vinyl alcohol have the optimum balance of properties with respect to compatibility with other substances and solubility characteristics. Ether-alcohols and glycol and polyglycol ethers, such as ethoxy-ethanol, diethylene glycol monoethyl ether, ethylene glycol diethyl ether, and diethylene glycol diethyl ether dissolve copolymers of vinyl chloride, vinyl acetate and vinyl alcohol more easily than they dissolve copolymers of vinyl chloride and vinyl acetate, depending on the vinyl alcohol content of the hydrolyzed resin.

The above named compounds are good solvents at temperatures of 25° to 90° C. for a copolymer of vinyl chloride 81.6%, vinyl acetate 7.0%, and vinyl alcohol 11.4%.

Lacquers comprising copolymers of vinyl chloride, vinyl acetate and vinyl alcohol containing alcohols as a constituent of the thinner have a slower rate of solvent action on the resins, and thus subsequent coats of the lacquer do not tend to dissolve the underlying coat with consequent marring of the finish.

A wide variety of coating compositions may be formulated employing the copolymers of vinyl chloride, vinyl acetate, and vinyl alcohol. In one type, these copolymers are employed as the sole resinous constituent of the compositions to form coatings having improved adhesion to smooth surfaces. Such coatings may be air-dried or baked at temperatures of 250° to 350° F. A particular advantage of this type of coating is that cheaper and more permanent plasticizers, such as castor oil, may be employed. Castor oil derivatives, such as butyl acetyl ricinoleate and the methyl, ethyl and butyl esters of acetylated polymerized ricinoleic acids are also compatible with the copolymers.

A second type of coating is one in which the copolymers of vinyl chloride, vinyl acetate and vinyl alcohol are blended with thermoplastic resins. These thermoplastic resins may serve to improve the adhesion of the coatings, to plasticize the hydrolyzed copolymer, or to secure special effects, such as improved resistance to moisture, depending on the nature of the thermoplastic resin. Examples of relatively soft thermoplastic resins which may be used to plasticize the copolymers or to improve the adhesion of coatings containing them are polymers of butyl acrylate and butyl methacrylate, polyvinyl acetate, partially hydrolyzed polyvinyl acetate, polyvinyl acetal resins, such as polyvinyl butyral resins, polymerized terpene resins and natural resins, such as shellac and dammar gum. Examples of the harder types of thermoplastic resins which may be blended with the hydrolyzed copolymers include the copolymers of vinyl chloride and vinyl acetate containing from 85 to 98% vinyl chloride, copolymers of vinyl chloride with ethyl or butyl acrylate containing about 80% vinyl chloride, copolymers of vinyl chloride and vinylidine chloride containing over 85% vinyl chloride and polyvinyl chloride.

Distinguished from the thermoplastic coatings are those in which the copolymers of vinyl chloride, vinyl acetate and vinyl alcohol are mixed with non-resinous ingredients with which the copolymers react or combine to form coatings of reduced thermplasticity and improved resistance to solvents. To secure these hardening effects, it is usually necessary for the coatings to be baked at temperatures of 300° F. or higher, although in certain instances air-drying is satisfactory. The modifying ingredients may be inorganic substances, which include copper salts, such as copper sulfate and copper chromate, chromium compounds, such as potassium dichromate, zinc chromate, and chromium acetate, chlorine and substances readily releasing chlorine, such as sulfur chloride as they may be organic compounds, such as glyoxal, methyl glyoxal, or compositions capable of releasing glyoxal, such as glyoxal tetraethyl acetal and phosphoric acid, as well as other aldehydes, such as furfural. In working with chlorine and chlorine releasing compounds, the coatings are usually exposed to the vapors of these treating agents after application to the surface to be protected. Rubber accelerators, such as the acetal of butyraldehyde and aniline, diphenyl guanidine, triphenyl guanidine, dibenzylamine, parabenzoquinone dioxime, and dibenzoparaquinone dioxime may also be employed as insolubilizing ingredients, as well as dibasic acids, such as maleic and succinic acids. The amount of the modifying ingredient may vary from about 2 to 15% by weight of the hydrolyzed copolymer.

Other kinds of heat-hardening coatings are those in which the copolymers of vinyl chloride, vinyl acetate and vinyl alcohol are blended with heat-reactive synthetic resins in amounts ranging from 1 to 20 parts of the copolymers with from 10 to 1 parts of the heat-reactive resins. The heat-reactive resins comprise aminoplasts and phenolic condensation products, and are usually employed in amounts ranging from 5 to 15% of the copolymers. The aminoplasts are usually condensation products of urea or melamine with formaldehyde, which are condensed in the presence of an acid catalyst and an alcohol, such as butanol or 2-ethyl hexanol until products are obtained which are soluble in alcohols. Phenolic condensation products include reaction products of formaldehyde with phenols, such as phenol, ortho-, meta- and paracresol, p-phenylphenol, xylenol and the like. The heat-reactive phenolic reaction products are usually prepared by reacting the phenol and formaldehyde to an intermediate stage in the presence of an alkaline catalyst, such as sodium hydroxide or triethanolamine. The aminoplasts are frequently manufactured in the presence of condensation products of polyhydric alcohols and polybasic acids, such as glycerylphthalate resins, whereas the phenolic varnishes are frequently modified with an oil, such as castor oil, linseed oil or tung oil. On baking the coatings containing the vinyl chloride, vinyl acetate and vinyl alcohol copolymers with these heat-reactive resins, an improvement in the solvent resistance, moisture resistance and softening point is usually noted which cannot be accounted for on additive considerations.

Melamine-formaldehyde resins modified with alkyd resins and alcohols in their manufacture, in the presence of phosphoric acid as a curing catalyst, appear to insolubilize the hydrolyzed copolymers most completely on baking at 300° F. or higher, when at least 10% of the aminoplast by weight of the hydrolyzed resin is present. These compositions may be used to coat textile filaments with a tapered coating to form brush bristles having excellent resistance to paint thinner.

Coatings which harden on air-drying can be made by including both glyoxal and heat-reactive phenol-formaldehyde resins in the lacquer.

Another type of heat-hardening coating is one in which the copolymer of vinyl chloride, vinyl acetate and vinyl alcohol is baked with a resinous material containing free carboxyl groups, for instance, copolymers of styrene with maleic anhydride, or copolymers of vinyl chloride, vinyl acetate and maleic acid, such as those described in Campbell Patent No. 2,329,456. The hydrolyzed copolymers may be blended with these latter resins in about equal amounts, or in amounts ranging from 1 to 10 parts of the hydrolyzed copolymer with 10 to 1 parts of the copolymers of vinyl chloride, vinyl acetate and alpha, beta-olefinic carboxylic acids. Such blends have improved adhesion to many surfaces, such as cloth, metal and paper on air-drying.

To be differentiated from coatings of the hardening type described above, are those in which further chemical reaction or modification of the added ingredient occurs on heating or air-drying, but no apparent chemical modification of the copolymer of vinyl chloride, vinyl acetate and vinyl alcohol occurs. Thus, these copolymers may be employed in paints containing drying oils, such as tung oil, linseed oil or dehydrated castor oil, in which the drying oils polymerize or oxidize on air-drying. The resinous copolymers impart improved flexibility, toughness and ease of drying to films deposited from such paints. High-boiling liquids containing vinyl or allyl groups can be used as plasticizers with these resins, then caused to polymerize in the film by heating, with or without peroxide catalysts being present. Coatings containing a copolymer resin may also be modified by the presence of synthetic elastomers, such as butadiene-acrylonitrile copolymers which vulcanize on baking, and act as plasticizers for the hydrolyzed copolymers.

Combinations of the copolymers of vinyl chloride, vinyl acetate and vinyl alcohol with alkyd resins form a very useful embodiment of the invention and may be divided into two categories. In one type the vinyl copolymers predominate, and the alkyd resins serve to plasticize the vinyl resins in a permanent manner. Also, pigments may be incorporated in the alkyd resins, and the pigmented compositions serve as a vehicle for introducing the pigments into the finish, because of the readiness with which pigments may be incorporated into alkyd resins. Incorporation of the alkyd resins in lacquers containing the hydrolyzed copolymers provides improved flow-out of lacquers. When baked over steel, the alkyd resins slightly improve the heat stability of the coating, although it is usually essential to include a stabilizing pigment, such as basic lead sulfate, or a stabilizing resin, such as a urea-formaldehyde resin, or a phenol diethanolamine phthalate resin for this purpose.

Fortified alkyd resin varnishes constitute the other type of combination. In forming these fortified varnishes, the copolymers of vinyl chloride, vinyl acetate and vinyl alcohol are incorporated therein in amounts of from about 5 to 50% of the total resinous constituents of the varnish. In such compositions, the vinyl copolymers improve the film strength of the alkyd resins and impart greater permanence to the finish on exterior exposure. In particular, the hydrolyzed copolymers increase the resistance of the finish to alkaline materials.

The alkyd resins may be either unmodified or modified with drying, non-drying or semi-drying oils. For instance, glyceryl-phthalate resins, triethylene glycol-maleate resins, and pentaerythrityl-phthalate resins are examples of unmodified alkyd resins, whereas glyceryl-phthalate resins and glyceryl-endomethylene tetrahydrophthalate resins modified with castor oil, linseed oil or tung oil are examples of oil-modified alkyd resins. In place of the designated acids, any poly-functional acid may be employed in forming the alkyd resins, such as succinic acid, adipic acid, sebacic acid, adducts of terpenes, such as limonene, with maleic anhydride, adducts of abietic acid with maleic anhydride, and methyl hexahydrophthalic acid. In place of the polyhydric alcohols mentioned, there may be employed diethylene glycol, ethylene glycol, sorbitol, dipropylene glycol, butylene glycol and the like.

The coating compositions of this invention may be applied to a number of surfaces to give them a protective and decorative finish. They may be applied to metal surfaces, such as iron, tin, lead, aluminum, tin plate, zinc and copper. The metal may be in the form of sheets, foils or filaments. Coatings on metal surfaces are very tough and resist subsequent stamping and bending operations. The metal surface may bear any of the usual primer coatings, such as oleoresinous varnishes, oil-modified alkyd resins and phenol-formaldehyde varnishes. As previously noted, the adhesion of the copolymers of vinyl chloride, vinyl acetate and vinyl alcohol to these surfaces on air-drying is very good.

Paper coated with the compositions of this invention has good heat-sealing properties and resistance to oil, alkalies and acids. The coated paper is useful for wrapping a variety of products, including soap and food products, such as cheese, meats, dehydrated edibles and the like. High-melting paraffin waxes and terpene resins, such as polymerized pinene and limonene, may be included in the coatings to improve the resistance to moisture. Likewise, heat-reactive resins, such as the aminoplasts, may be included to raise the softening point of the coating and to decrease its tendency to "block" or adhere to itself when warm and under pressure.

Highly plasticized coatings may be employed for coating cloth to render it moisture-proof. Compositions plasticized with castor oil are excellent for this purpose. Very light coatings may be applied over cloth which has been treated with a water-repellent material to yield a fabric which is air-permeable, yet water-resistant.

Paints of the air-drying type, including a drying oil, such as linseed oil or tung oil, and a pigment, such as titanium dioxide, may be used for coating wood. Air-drying compositions containing the hydrolyzed copolymer, glyoxal, and a heat-active phenol-formaldehyde resin may be employed in coating plywood with a film which is resistant to gasoline. Plywood coated in this manner may be used in forming disposable fuel tanks for airplanes.

The compositions are also useful for coating concrete which is exposed to water, as in swimming pools. Coatings for rubber is another field for the compositions. Yarns or filaments of cotton, rayon and the like may be coated to improve the strength of the fibers. Yarn, filaments, or textiles made of nylon may be coated with the composition to protect the nylon against hydrolysis caused by acid or alkaline environments.

The usual lacquer thinners which have been developed for the copolymers of vinyl chloride and vinyl acetate may be employed in forming solutions of the copolymers of vinyl chloride, vinyl acetate and vinyl alcohol. Modification of these thinners permits the development of lacquers which do not soften oleoresinous primer coatings. The usual solvents employed in thinners for vinyl resin lacquer are the ketones, such as methylethyl ketone, methyl isobutyl ketone, methyl amyl ketone, cyclohexanone and isophorone, and the nitroparaffins, such as nitropropane. These solvents are usually blended with aromatic hydrocarbons, such as toluene, xylene, tetrahydronaphthalene and the like. In formulating the lacquers for maximum solvent release and minimum softening of primer coatings, it is desirable to modify these thinners by the inclusion of alcohols, such as ethanol, isopropanol, butanol, 2-ethylbutanol and 2-ethyl- hexanol. Even better results are obtained by employing esters, such as ethyl acetate, isopropyl acetate, butyl acetate, or 2-ethylbutyl acetate, in place of ketones, as the primary solvent along with alcohols and aromatic hydrocarbons as diluents. Lacquers containing the hydrolyzed copolymers and esters as the primary solvent show less tendency toward thixotropism than do lacquers containing the unhydrolyzed copolymers dissolved in ester solvents. The tolerance for alcohols of the copolymers of vinyl chloride, vinyl acetate and vinyl alcohol increases with the percentage of vinyl alcohol combined in the polymer within the range of the present invention. However, a copolymer containing more than about 30% vinyl alcohol tends to be increasingly insoluble in organic solvents.

Solutions of the copolymers of vinyl chloride, vinyl acetate and vinyl alcohol may be dispersed in water with the aid of emulsifying agents to form emulsions which have considerable value in impregnating textiles. The copolymers may be dispersed in water by the aid of dispersing agents, such as water-soluble partially hydrolyzed polyvinyl acetate, to form aqueous suspensions which are useful for sizing and stiffening textile materials.

In hydrolyzing the copolymers of vinyl chloride and vinyl acetate, certain precautions should be observed so as to hydrolyze the acetate groups selectively without removing the chloride radicals. In general, saponification reactions involving heating the copolymers of vinyl chloride with vinyl acetate with aqueous sodium hydroxide in stoichiometric amounts are unsatisfactory, because discoloration and degradation of the copolymers occurs, presumably because of removal of the chloride radicals. Although alkaline catalysts can be employed, the hydrolysis or alcoholysis is best carried out in an acid, rather than in an alkaline medium, employing an anhydrous alcohol to remove part of the acetate groups through alcoholysis. Any strong acid, such as hydrochloric, sulfuric or phosphoric acid may be used to catalyze the alcoholysis. To simplify the recovery of solvents, we preferably employ methyl acetate as a solvent for the resin and methanol as the reactant in the alcoholysis, since the product of the alcoholysis is then methyl acetate, the solvent employed. Resins having better color and heat stability are formed by carrying out the alcoholysis at temperatures below 70° C.

In order for the copolymers of vinyl chloride, vinyl acetate and vinyl alcohol to exhibit the improved properties described herein, it is desirable that they contain at least 2.0% by weight of vinyl alcohol. To provide compositions of the best compatibility with other ingredients and for best adhesion of the coatings, it is preferable that the copolymers contain at least 5% of vinyl alcohol. The vinyl acetate constituent of the copolymers makes the resins more flexible and prevents them from becoming brittle. Thus our preferred resins contain by weight from 80 to 92% vinyl chloride, from 5 to 15% vinyl alcohol, and from 3 to 15% vinyl acetate.

The more useful products from the standpoint of solubility in organic solvents are derived from copolymers of vinyl chloride and vinyl aceate having relative average molecular weights between 5000 and 25,000 as determined by Staudinger's method (Douglas and Stoops, Industrial Engineering and Chemistry, volume 28, page 1152, 1936). The vinyl alcohol values for the vinyl chloride, vinyl acetate, vinyl alcohol copolymers are computed from the hydroxyl values of the copolymers as determined by acetylation with 1.5 normal acetic anhydride in pyridine.

The following examples will illustrate the preparation of the hydrolyzed copolymers and their utility in coatings and forming films.

Example 1

Sixteen and four-tenths (16.4) parts of the copolymer of vinyl chloride, 88% vinyl acetate, 12%, were dissolved in a mixture of 74.6 parts of methylethyl ketone and 33.7 parts of methanol. The mixture was heated to 60° C. and 1.29 parts of sulfuric acid and 3 parts of methanol were added. The mixture was heated with agitation for 18.5 hours, after which the catalyst was neutralized with sodium acetate.

The hydrolyzed resin was precipitated from solution by the addition of methanol, then washed with equal parts of methanol and water and finally washed with water. The hydrolyzed copolymer contained 92.1% vinyl chloride, 2.9% vinyl acetate and 5.0% vinyl alcohol, indicating that the hydrolysis was 77.2% complete. The hydrolyzed copolymer was characterized by increased compatibility with alkyd resins, castor oil, polyvinyl acetate, tung oil, phenol-formaldehyde resins and melamine-formaldehyde resins. The resin had a softening point by the ball and ring method of 160° C. The hydrolyzed copolymer was insoluble in hot toluene and benzene, whereas the unhydrolyzed copolymer is soluble in these liquids when hot. Solutions of the hydrolyzed copolymer tolerated larger quantities of alcohol before precipitating, then do the unhydrolyzed resins.

Example 2

Fifty (50) parts of a copolymer of vinyl chloride, 86.7% and vinyl acetate, 13.3% were dissolved in 450 parts of ethyl acetate and 50 parts of anhydrous ethanol. The mixture was heated until a mild reflux was established. To the heated mixture, 51.6 parts of a 0.6778 normal solution of sodium methylate was added and reflux continued for 5 hours. After cooling, the hydrolyzed copolymer was precipitated by adding a mixture containing 95 parts of methanol and 5 parts of water. The precipitated resin was washed with water and dried and found to be of a light yellow color having a vinyl alcohol content of 5.2%, corresponding to 80.6% hydrolysis of the acetate groups of the original resin. The extent of the hydrolysis was appreciably greater than the stoichiometric equivalent of the sodium methylate added, indicating that alcoholysis rather than saponification occurred. The properties of the resin were similar to those of Example 1.

Example 3

Three hundred and fifty (350) parts of resin resulting from the copolymerization of 705 parts of vinyl chloride and 295 parts of vinyl acetate were dissolved in a mixture of 1595 parts of methylethyl ketone and 1420 parts of methyl alcohol. The solution was then heated to 64.5° C. to maintain a gentle reflux. A mixture composed of 38.7 parts of concentrated sulfuric acid and 90.3 parts of methanol was then added. After the addition of the catalyst, heating was continued for 42 hours. The catalyst was then neutralized by the addition of a 10% molar excess of sodium acetate. The hydrolyzed copolymer was precipitated from solution by water and dried.

The hydrolyzed copolymer was a very light color and contained 14.2% vinyl alcohol by analysis. This corresponds to 83% hydrolysis of the acetyl groups of the original copolymer. Films deposited from clear solutions of the resin had excellent adhesion to steel on air-drying. The hydrolyzed copolymer was compatible with various alkyd resins, castor oil, polyvinyl acetate, tung oil, phenol-formaldehyde resins, melamine-formaldehyde resins, partially hydrolyzed polyvinyl acetate containing 9% vinyl alcohol and polyvinyl partial butyral resin containing 11% vinyl alcohol.

Example 4

Four hundred (400) parts of a copolymer of vinyl chloride and vinyl acetate containg 78% vinyl chloride, were dissolved in a mixture of 2100 parts of methylethyl ketone and 1532 parts of methanol. The temperature of the solution was raised to 65° C. and a mild reflux established. At this point, a mixture of 37.8 parts of concentrated sulfuric acid and 88.2 parts of anhydrous methanol was added. At the end of 25 hours, the catalyst was neutralized with sodium acetate. The hydrolyzed copolymer was precipitated with water, washed and dried. It contained 85.5% vinyl chloride, 8.85% vinyl alcohol and 5.65% vinyl acetate, corresponding to hydrolysis of 74.9% of the acetyl groups of the original copolymer. The properties of the resin were similar to those heretofore described. Similar results were obtained by repeating the example using 45 c.c. of 11 normal hydrochloric acid in methanol as the catalyst. In this instance, the resin contained 85.25% vinyl chloride, 8.41% vinyl alcohol and 6.34% vinyl acetate.

Example 5

Two coating compositions containing the followin ingredients were prepared:

|  | A | B |
|---|---|---|
|  | Parts by wt. | Parts by wt. |
| Copolymer of vinyl chloride, 87%; vinyl acetate, 13% | 2.00 | 16.00 |
| Copolymer of vinyl chloride, 91.5%; vinyl acetate, 2.7%; and vinyl alcohol, 5.8% | 14.00 | |
| Titanium dioxide | 9.15 | 9.15 |
| Antimony oxide | 1.00 | 1.00 |
| Di(butoxyethyl) phthalate | 1.07 | 1.07 |
| Tricresyl phosphate | 3.00 | 3.00 |
| Blown castor oil (#15 oil) | .13 | .13 |
| Methylisobutyl ketone | 34.82 | 34.82 |
| Toluene | 34.83 | 34.83 |
|  | 100.00 | 100.00 |

Lacquer A showed excellent adhesion on air-drying to primer coatings of phenol-formaldehyde varnish type resins, "Duraplex" C-45, P-27-B Naval Aircraft Primer and phenol-formaldehyde "dispersion" type resins. On the other hand, composition B showed poor to very poor adhesion on air-drying to the same primer coatings.

Example 6

Films of the following composition were prepared:

| | Percent |
|---|---|
| Copolymer of vinyl chloride, 90.3%; vinyl acetate, 6.3%; vinyl alcohol, 3.4% | 80 |
| C. P. castor oil | 15 |
| Di-2-ethylhexyl phthalate | 5 |
| | 100 |

|   | Percent |
|---|---|
| Copolymer of vinyl chloride, 91.6%; vinyl acetate, 3.5%; vinyl alcohol, 4.9% | 76.9 |
| C. P. castor oil | 16.7 |
| Di-2-ethylhexyl phthalate | 6.4 |
|   | 100.0 |

These films showed no tendency to stick to each other or to lacquered surfaces during an aging period of 12 months at room temperature. On the other hand, highly plasticized films of copolymers of vinyl chloride and vinyl acetate of molecular weights of about 10,000 were quite tacky and had a tendency to stick to each other and to lacquered surfaces. Castor oil showed no tendency to exude from films of the hydrolyzed copolymer plasticized therewith, whereas castor oil, when present in more than negligible proportions exuded from films containing copolymers of vinyl chloride and vinyl acetate.

Example 7

Four coating compositions containing the following ingredients were prepared:

|   | A | B | C | D |
|---|---|---|---|---|
|   | Per cent | Per cent | Per cent | Per cent |
| Toluidine toner | 15.8 | 9.5 | 15.8 | 9.5 |
| Raw linseed oil | 82.0 | 39.0 |   |   |
| Raw tung oil |   |   | 82.0 | 39.0 |
| Copolymer of vinyl chloride, 90.6%; vinyl acetate, 4.4%; and vinyl alcohol, 5.0% |   | 9.7 |   | 9.7 |
| Methyl n-amyl ketone |   | 19.4 |   | 19.4 |
| Toluene |   | 19.4 |   | 19.4 |
| Methyl amyl acetate |   | 1.449 |   | 1.449 |
| "Solvesso" #2 (blend of aromatic hydrocarbons, 93%; aliphatic hydrocarbons 7%) | 1.982 | 1.449 | 1.982 | 1.449 |
| Lead drier (as metal) | 0.210 | 0.098 | 0.210 | 0.098 |
| Cobalt drier (as metal) | 0.008 | 0.004 | 0.008 | 0.004 |
|   | 100.000 | 100.000 | 100.000 | 100.000 |

Compositions A and C when applied to an oak panel, brushed well and showed good leveling properties, but dried very slowly and lacked toughness when dry. Compositions B and D, on the other hand, displayed all of the good qualities of finishes A and C, and, in addition, dried rapidly to form tough films.

Example 8

A cloth-coating composition containing the following ingredients was prepared:

|   | Parts by weight |
|---|---|
| Iron oxide yellow | 1.20 |
| Lead titanate | 1.00 |
| Iron oxide black | 0.81 |
| Calcium carbonate, finely divided | 6.00 |
| Copolymer of vinyl chloride, 87.6%; vinyl acetate, 8.8%; and vinyl alcohol, 3.6% | 12.00 |
| Castor oil-modified glyceryl-phthalate alkyd resin | 10.00 |
| Raw castor oil | 3.29 |
| Methylethyl ketone | 23.00 |
| Methyl isobutyl ketone | 23.00 |
| Toluene | 19.70 |
|   | 100.00 |

This coating was applied to a strip of cloth by means of a laboratory-size cloth coating machine. The weight of the coating after drying was 3 ounces per square yard. The coated cloth has been exposed for seven months on accelerated exterior weathering and has shown negligible loss of flexibility and other deterioration of the coating.

Example 9

Two coating compositions containing the following ingredients were prepared:

|   | A | B |
|---|---|---|
|   | Parts by wt. | Parts by wt. |
| Titanium dioxide, anatase type | 19.7 | 21.400 |
| Copolymer of vinyl chloride, 90.6%; vinyl acetate, 4.4%; and vinyl alcohol, 5.0% | 10.0 |   |
| Glyceryl-phthalate alkyd resin modified with linseed fatty acids ("Duraplex" C-45) | 10.0 | 21.300 |
| Raw castor oil | 6.6 | 7.200 |
| Cobalt drier (as metal) |   | 0.006 |
| Methyl isobutyl ketone | 19.5 |   |
| Toluene | 19.5 |   |
| Xylene | 6.5 | 50.094 |
| Methyl n-amyl ketone | 8.2 |   |
|   | 100.0 | 100.000 |

Coatings A and B were each sprayed on steel test panels to a dried coating thickness of 1.3 mils. After both had dried to touch, they were baked 30 minutes at 310° F. in a forced convection oven. Upon cooling, the panels were placed in a humidity cabinet operating at 50° C. and 100% relative humidity, the panels being hung so that cooling coils caused continuous condensation of moisture on the face of the coating. Coating A withstood this treatment for 57 days before excessive blistering was observed. Coating B, on the other hand, containing no hydrolyzed copolymer, was removed after two days because of excessive blistering.

Example 10

Two coating compositions containing the following ingredients were prepared:

|   | A | B |
|---|---|---|
|   | Parts by wt. | Parts by wt. |
| Chrome green, dark | 8.000 | 12.500 |
| Glyceryl-phthalate alkyd resin modified with linseed fatty acids ("Duraplex" C-45) | 15.400 | 36.000 |
| Copolymer of vinyl chloride, 90.6%; vinyl acetate, 4.4%; and vinyl alcohol, 5.0% | 7.700 |   |
| Raw linseed oil | 22.800 | 36.000 |
| Methyl n-amyl ketone | 24.121 |   |
| Toluene | 15.121 |   |
| Mineral spirits | 6.621 | 14.924 |
| Lead drier (as metal) | 0.229 | 0.432 |
| Cobalt drier (as metal) | 0.008 | 0.144 |
|   | 100.000 | 100.000 |

Both coatings were brushed on oak panels. Coating B displayed good brushability and levelling, but dried slowly and had a tendency to be soft to touch when dry. Coating A, on the other hand, in addition to showing good brushability and levelling, dried rapidly to a hard, tough film.

Example 11

Two coating compositions were prepared as follows:

|   | A | B |
|---|---|---|
|   | Parts by wt. | Parts by wt. |
| Super spectra black | 2.07 | 1.52 |
| Drying type alkyd resin ("Duraplex" A-27) dry basis | 23.90 | 14.72 |
| Urea-formaldehyde resin ("Uformite" F-200) dry basis | 15.86 | 7.35 |
| Partially hydrolyzed copolymer of vinyl chloride and vinyl acetate (5% vinyl alcohol) |   | 7.17 |
| Methyl amyl ketone |   | 16.34 |
| Toluene |   | 16.34 |
| Xylene | 45.02 | 29.05 |
| Butanol | 13.15 | 7.51 |
|   | 100.00 | 100.00 |

Finish B exhibited better flexibility and resistance to alkali than finish A. The former was also faster drying.

Example 12

The following clear coating compositions were prepared:

|  | A | B |
|---|---|---|
|  | Parts by wt. | Parts by wt. |
| Copolymer of vinyl chloride and vinyl acetate | 18.9 |  |
| Partially hydrolyzed copolymer of vinyl chloride and vinyl acetate (2.0% vinyl alcohol) |  | 18.9 |
| Melamine-formaldehyde resin, alkyd modified ("Melmac" 586-9) | 2.8 | 2.8 |
| Methyl isobutyl ketone | 37.7 | 37.7 |
| Toluene | 37.8 | 37.8 |
| Butanol | 1.4 | 1.4 |
| Mineral spirits | 1.4 | 1.4 |
|  | 100.0 | 100.0 |

Each of the above compositions was applied over black iron panels which had been previously given a phosphatizing treatment. These panels were baked for ½ hour at 375° F., and immersed in boiling water for ½ hour, removed and allowed to cool spontaneously. The coating prepared from composition A was badly blushed by the boiling water treatment and exhibited no adhesion in contrast to the panel prepared from composition B which exhibited only a very slight blush and retained excellent adhesion.

Example 13

The following clear coating compositions were prepared:

|  | A | B |
|---|---|---|
|  | Parts by wt. | Parts by wt. |
| Copolymer of vinyl chloride and vinyl acetate | 18.9 |  |
| Partially hydrolyzed copolymer of vinyl chloride and vinyl acetate (2.0% vinyl alcohol) |  | 18.9 |
| Heat-hardenable phenol-formaldehyde resin | 2.8 | 2.8 |
| Methyl isobutyl ketone | 37.7 | 37.7 |
| Toluene | 37.8 | 37.8 |
| Xylol | 1.4 | 1.4 |
| Amyl alcohol | 1.4 | 1.4 |
|  | 100.0 | 100.0 |

Each of the above compositions was applied over black iron panels which had been phosphatized previously. They were baked for ½ hour at 375° F. and immersed in boiling water for ½ hour, removed and allowed to cool spontaneously. Coatings prepared from composition A were badly blushed and exhibited no adhesion in contrast to the panel prepared from composition B, which exhibited only a slight blush and retained excellent adhesion.

Example 14

An oil modified cresol-formaldehyde resin was prepared as follows:

|  | Grams |
|---|---|
| Cresol | 100 |
| Formaldehyde | 120 |
| Rosin | 60 |
| Tung oil | 160 |

The above ingredients were placed in a flask and heated with stirring until a reflux was maintained and the contents homogeneous. Hexamethylenetetramine (1.61 grams) was added and heating was continued for 5 hours while maintaining a gentle reflux. The resin was dehydrated and then diluted to 75% solids with xylene. After dilution, the composition had a viscosity of 230 centipoises.

The above resin was used in the preparation of solutions containing various ratios of hydrolyzed vinyl copolymer resin and oil modified cresol resin from 4 to 1 through 1 to 1 as follows:

| Solution | A | B | C | D | E |
|---|---|---|---|---|---|
|  | Gms. | Gms. | Gms. | Gms. | Gms. |
| Oil modified cresol-formaldehyde resin | 5 | 7.2 | 10 | 20 |  |
| Xylene | 3.3 | 4.8 | 7 | 13 |  |
| Partially hydrolyzed copolymer of vinyl chloride and vinyl acetate (5.3% vinyl alcohol) | 20 | 20 | 20 | 20 | 20 |
| Heptanone-2 | 60 | 60 | 60 | 60 | 60 |
| 4-methyl-pentanone-2 | 20 | 20 | 20 | 20 | 20 |
| Total | 108.3 | 112 | 117 | 133 | 100 |

Films from each of the above solutions were prepared by casting on glass plates, air drying for 24 hours and then baking out the residual solvent for ½ hour at 275° F. The films were removed and moisture transmission values obtained upon each. The fact that the M. V. T. values for all the films were within the range of 0.43 to 0.46, indicates that all the films were homogeneous.

Example 15

Ten and eight-tenths (10.8) parts of a copolymer of vinyl chloride, 89.7%, vinyl acetate, 4.0%, and vinyl alcohol, 7.2%, were dissolved in a mixture of 34.86 parts of 4-methyl pentanone and 14.94 parts of butanol to yield a viscous, but fluid solution. A sample of the resin from which the hydrolyzed copolymer was made containing 83.1% vinyl chloride and 16.9% vinyl acetate, formed a thixotropic solution when dispersed in the same mixture at the same concentration. Likewise, it has been shown that solutions of the hydrolyzed copolymer in mixtures of esters and hydrocarbons show a decrease in viscosity on dilution with alcohols, whereas similar solutions of the original resins exhibit an increase in viscosity on dilution with alcohols. To demonstrate this property, the following solutions were prepared:

|  | A | B | C | D |
|---|---|---|---|---|
| Copolymer of vinyl chloride, 89.7%; vinyl acetate, 4.0%; vinyl alcohol, 7.2%...grams |  |  | 6 | 6 |
| Copolymer of vinyl chloride, 83.1%; vinyl acetate, 16.9%...grams | 6 | 6 |  |  |
| Butyl acetate...do | 27.0 | 24.3 | 27.0 | 24.3 |
| Toluene...do | 27.0 | 27.0 | 27.0 | 27.0 |
| Butanol...do |  | 2.7 |  | 2.7 |
| Specific viscosity No. 2 Zahn cup at 80° F...seconds | 21.8 | 23.3 | 50.9 | 47.6 |

Example 16

Forty (40) parts of partially hydrolyzed copolymer of vinyl chloride and vinyl acetate containing 5.2% vinyl alcohol were dissolved in 160 parts of acetone and to this solution 2.4 parts of a 30% solution of glyoxal in water were added. To this mixture 0.008 part of thiourea was added to facilitate the reaction of glyoxal and the resin. Films cast from the solution were dried in air for 15 minutes, and then baked for 0.5 hour at 300° F. The baked films were insoluble in acetone.

Example 17

Three copolymers of vinyl chloride, vinyl acetate and vinyl alcohol containing respectively 90.7%, 82.6% and 83.8% vinyl chloride, 4.3%, 8.6% and 1.5% vinyl acetate and 5.0%, 8.8% and 14.7% vinyl alcohol were dissolved to form separate solutions and 10% by weight of the copolymers of a melamine-formaldehyde resin ("Melmac" 586-9) was added to each solution. Films were cast for each solution and baked for one-half hour at 300° F. None of the films softened on soaking in toluene for 0.5 hour. To another solution of vinyl chloride-vinyl acetate-vinyl alcohol copolymer, 20% by weight of the copolymer of the same melamine-formaldehyde resin together with a trace of phosphoric acid were added. After baking the films at 300° F., they had good resistance to acetone.

*Example 18*

The following pigmented composition was prepared:

| | Per cent |
|---|---|
| Copolymer of vinyl chloride, 91.3%; vinyl alcohol 5.8%; vinyl acetate 2.9% | 10.5 |
| Titanium dioxide | 11.8 |
| "Acryloid"-B-75 (30% solution of polyethyl or butyl acrylate) | 5.5 |
| Methyl isobutyl ketone | 28.9 |
| Methyl amyl ketone | 7.2 |
| Toluene | 28.9 |
| Xylene | 7.2 |
| | 100.0 |

In preparing the composition, the pigment was initially ground in the acrylate polymer on a stone mill. The pigmented lacquer was sprayed over a primer coating of a vinyl chloride-vinyl acetate copolymer containing a stabilizing lead pigment and baked for 30 minutes at 300° F. When tested in the humidity cabinet described in Example 9, the finish showed good resistance on prolonged exposure.

*Example 19*

The following clear solutions were prepared:

| | A | B |
|---|---|---|
| | Parts by wt. | Parts by wt. |
| Copolymer of vinyl chloride, 86%; and vinyl acetate, 14% | 28.0 | |
| Copolymer of vinyl chloride, 90.7%; vinyl alcohol, 5.0%; and vinyl acetate, 4.3% | | 28.0 |
| Methoxyethyl 12 acetoxyoleate | 2.0 | 2.0 |
| Tricresyl phosphate | 2.0 | 2.0 |
| Dibutyl phthalate | 1.0 | 1.0 |
| Methylethyl ketone | 23.4 | 23.4 |
| Methylisobutyl ketone | 23.4 | 23.4 |
| Toluene | 20.2 | 20.2 |
| | 100.0 | 100.0 |

The above solutions were applied to a standard printed soap wrapper by means of a commercial solution coating machine. Thickness of 0.001 inch of dry film was applied and given a bake of 6 minutes at an average temperature of 120° C. (248° F.). The coating from solution B showed excellent adherence to both the paper and the inks used in the wrapper design. The film from coating A did not adhere at the lower baking temperature, and it was necessary to bake the film at 135° C. (275° F.) followed by a 10 second bake at 204° C. (400° F.) to achieve any appreciable adhesion to the paper. Even then solution B showed superior adherence to the inks forming the design of the wrapper.

The above examples have been given to show the representative compatibility and reactivity of the copolymers of vinyl chloride, vinyl acetate and vinyl alcohol. Other modifications will be apparent to those skilled in the art, and are included within the scope of the invention.

We claim:

1. A composition including a copolymer of vinyl chloride, vinyl acetate and vinyl alcohol containing from 80 to 92% vinyl chloride, from 5 to 15% vinyl alcohol and from 3 to 15% vinyl acetate, a film-forming ingredient compatible with said copolymer, and an organic solvent.

2. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a vegetable oil, and an organic solvent.

3. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, castor oil, and an organic solvent.

4. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a thermosetting resin, and an organic solvent.

5. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, an alkyd resin, and an organic solvent.

6. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a vegetable oil-modified alkyd resin, and an organic solvent.

7. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a castor oil-modified glycerylphthalate resin, and an organic solvent.

8. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a phenol-formaldehyde resin, and an organic solvent.

9. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a drying oil-modified phenol-formaldehyde resin, and an organic solvent.

10. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a castor oil-modified phenol-formaldehyde resin, and an organic solvent.

11. A film-forming composition including a copolymer of vinyl chloride, vinyl acetate and vinyl alcohol containing from 80 to 92% vinyl chloride, from 5 to 15% vinyl alcohol and from 3 to 15% vinyl acetate, a urea-formaldehyde resin, and an organic solvent.

12. A film-forming composition including a copolymer of vinyl chloride, vinyl acetate and vinyl alcohol containing from 80 to 92% vinyl chloride, from 5 to 15% vinyl alcohol and from 3 to 15% vinyl acetate; a copolymer of vinyl chloride, vinyl acetate and maleic acid containing from 60 to 95% vinyl chloride and from 0.1 to 4% maleic acid, the remainder being vinyl acetate; and an organic solvent.

GEORGE R. PENN, JR.
JOHN F. SUTER.

REFERENCES CITED

The following references are of record in the file of this patent:

UNITED STATES PATENTS

| Number | Name | Date |
|---|---|---|
| 1,921,326 | Robertson | Aug. 8, 1933 |
| 2,343,997 | Powell | Mar. 14, 1944 |
| 2,358,387 | Dreyfus | Sept. 19, 1944 |
| 2,400,808 | Burns | May 21, 1946 |

FOREIGN PATENTS

| Number | Country | Date |
|---|---|---|
| 565,633 | Germany | Dec. 3, 1932 |
| 659,042 | Germany | Apr. 22, 1938 |

OTHER REFERENCES

Vinylite Resins Series V, Resins for Surface Coatings, p. 11; published, 1939, by Carbide and Carbon Chem. Corp., N. Y.

"Vinylite Copolymer Resins for Surface Coatings," pages 31–34, published, 1942, by Carbide & Carbon Chem. Corp.